United States Patent [19]

Burnett et al.

[11] 4,266,225

[45] May 5, 1981

[54] DISPLAY PANEL INTERFACE CIRCUIT

[76] Inventors: Bradley W. Burnett, 101 N. Linda, Hobart, Ind. 46342; Leonard A. Fish, 21 W. Goethe St., Chicago, Ill. 60610

[21] Appl. No.: 966,653

[22] Filed: Dec. 5, 1978

[51] Int. Cl.[3] .............................................. G06F 3/14

[52] U.S. Cl. .................................... 340/799; 340/718; 340/766; 340/801

[58] Field of Search ............... 340/718, 759, 774, 805, 340/719, 798, 799, 800, 801, 766

[56] References Cited

U.S. PATENT DOCUMENTS

| | | | |
|---|---|---|---|
| 3,048,824 | 8/1962 | Thompson | 340/718 |
| 3,668,688 | 6/1972 | Schmersal | 340/718 |
| 3,754,161 | 8/1973 | Johnson | 340/718 |
| 3,908,151 | 9/1975 | Schermerhorn | 340/774 |
| 3,989,974 | 11/1976 | Tottori | 340/718 |
| 4,044,280 | 8/1977 | Shulski | 340/759 |
| 4,147,960 | 4/1979 | Andoh et al. | 340/774 |

*Primary Examiner*—Marshall M. Curtis

[57] ABSTRACT

A compact interface unit for use with a scanning plasma display, has a random access memory unit for storing representation of characters to be displayed, and apparatus for cyclically energizing the dots of the matrix. New character codes are written into the random access memory unit during the time the dots of the display unit are energized. A column counter specifies which of the 5 columns is to be read out at any given time, and character generator ROM'S are provided to read out a 5×7 dot matrix for selected characters on a column-by-column basis, and a parallel-to-series counter unit converted to the ROM'S provide a serial data stream corresponding to the same dot column of characters in multiple rows. Two serial-to-parallel converters are provided for separating the serial data stream into control signals for controlling the energization of the rows of dots of the matrix unit. In the preferred embodiment, the interface is mounted on the back of the display device. The total depth of the interface is one and one-half inches.

8 Claims, 8 Drawing Figures

Fig. 1
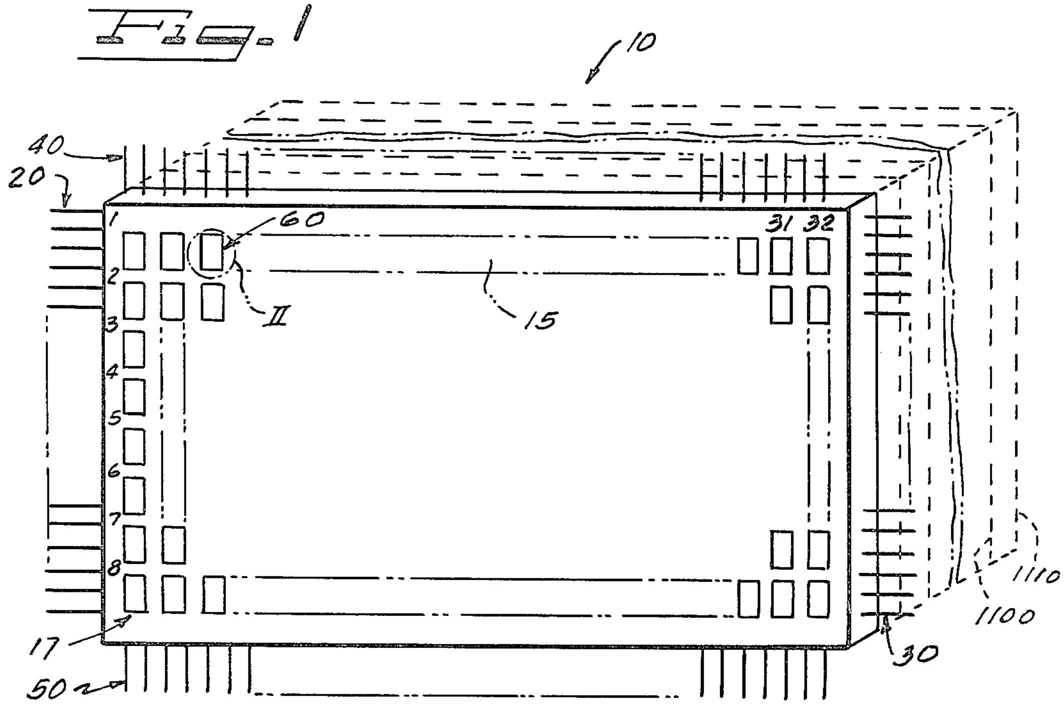
Fig. 2
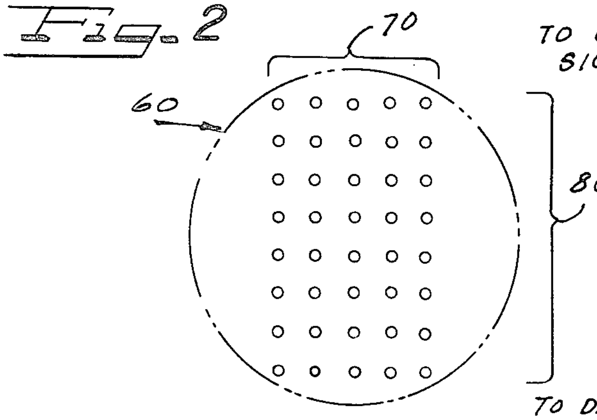
Fig. 6
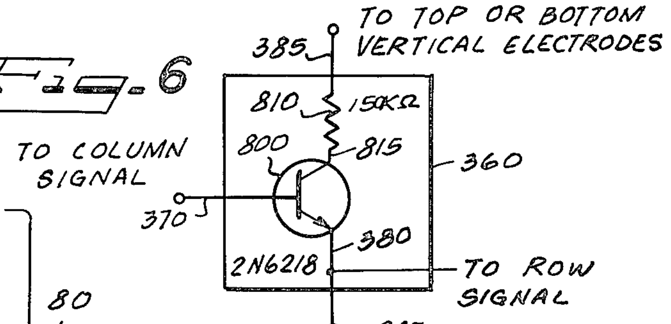
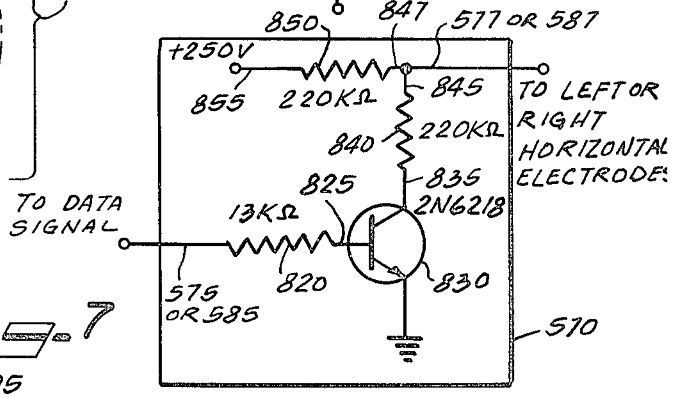
Fig. 7
Fig. 4
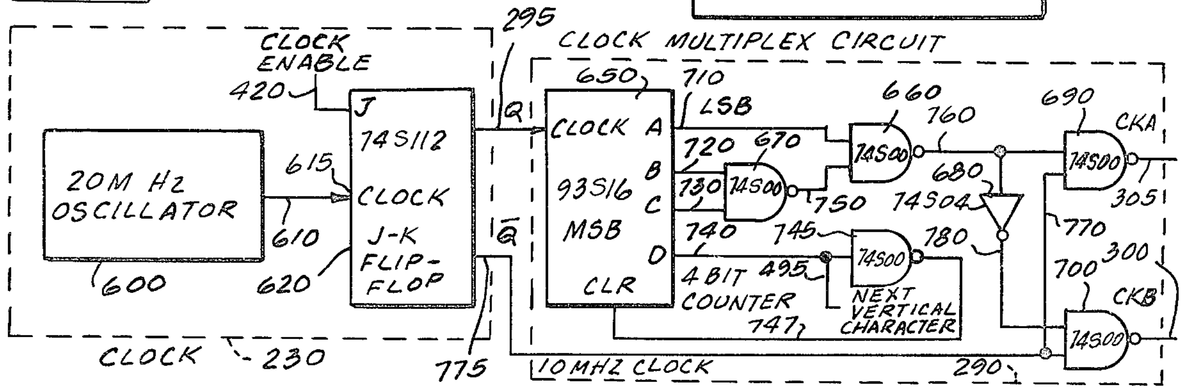

DISPLAY PANEL INTERFACE CIRCUIT

BACKGROUND OF THE INVENTION

1. Field of the Invention

This invention relates to the field of computer interfaces for scanning plasma display devices.

2. The Prior Art

Plasma devices have been available for a number of years. With them have been associated various types of interfaces. There has been a need, however, in situations where space is critical for a highly compact interface which can be mounted on the back of the display unit and have a very minimal depth. This need has not been solved by the prior art interfaces.

SUMMARY OF THE INVENTION

The invention comprises a very compact interface for a scanning plasma or a dot matrix display. Scanning plasma displays are dot displays with rows of horizontal and vertical electrodes brought to all four sides of the display. Refresh at a 60 HZ rate is required to maintain a flicker-free display. Refresh is accomplished by presenting 64 bits of data in parallel to 64 horizontal electrodes, brought to the right and left side of the display, while a selected column electrode, one of 160, is energized.

Eight rows of 32 characters may be simultaneously displayed. Thus, 8 bits from 8 vertical characters must be assembled in parallel to provide the 64 bits of data to refresh one column electrode.

The interface claimed herein may be mounted on two printed circuit boards affixed to the rear of the display device. The resulting interface, consisting of two printed circuit boards, one for the logic circuits and one for the buffer circuits is only one and one-half inches deep.

The interface comprises in combination computer communication circuits for communicating with a host computer, a random access memory unit (RAM) for storing the character codes to be displayed on the scanning plasma display, a 5×7 character generator ROM system which is addressed in part by a 6 bit character code read out from the RAM memory and in part by a 3 bit column counter which selects which of 5 columns is currently being displayed for a given character. The 7 bit column output of the 5×7 character generator roms, in addition to an underline indicator, is loaded into a parallel to serial converter unit. This unit converts the 8 bits of parallel data to a serial 8 bit string. The eight bits of data in the serial stream are split between two series to parallel converter units. The outputs of the series to parallel converter units, after being connected to buffer circuits, are then connected to either the left or the right set of horizontal electrodes associated with the scanning plasma display. Since there are two series to parallel converter units, one is associated with the left set of electrodes and one is associated with the right set of electrodes. A special pair of mutually exclusive clock signals is generated in a clock multiplex circuit which results in data from the parallel to serial converter being read partly into the series to parallel converter associated with the left set of horizontal electrodes and party into the series to parallel converter associated with the right set of horizontal electrodes. A set of column counters keeps track of which column in the scanning plasma display is correctly being refreshed. To select the appropriate column, the outputs of the column counters are passed through a 10×16 matrix of a conventional type which is used to select one out of the 160 columns. A control unit synchronizes the new data being made available through the computer communication circuits with the scanning refresh cycle being carried out by the interface with the existing character set stored in the RAM memory. The RAM memory is addressed during the refresh cycle by a set of scanning readout counters and is addressed during a write cycle from the computer by an 8 bit address supplied by the computer communication circuits. A blink control circuit is available to blink selected characters. It is connected between the random axis memory unit and the 5×7 character generator ROM unit. It has a one-half hertz or one hertz oscillator which suppresses the output from the 5×7 character generator ROMS for a specified character thereby resulting in a blinking display for that character.

The connections between the buffered outputs of the series to parallel converters and the left or right horizontal electrodes as well as the connections from the outputs of the 10×16 matrix to the top or bottom electrodes may be implemented by a pair of printed circuit boards mounted on the rear of the display device.

BRIEF DESCRIPTION OF THE FIGURES

FIG. 1 is an orthographic view of a conventional multilayer scanning display unit.

FIG. 2 is a planar view of a 5×8 character matrix.

FIG. 4 is a schematic diagram of the details of the circuit used to generate two mutually exclusive trains of clock pulses.

FIG. 6 is a schematic diagram of the driver unit for use in the 10×16 matrix.

FIG. 7 is a schematic diagram of the buffer units used in conjunction with the serial to parallel converter units.

DESCRIPTION OF THE PREFERRED EMBODIMENTS

Figure 3:
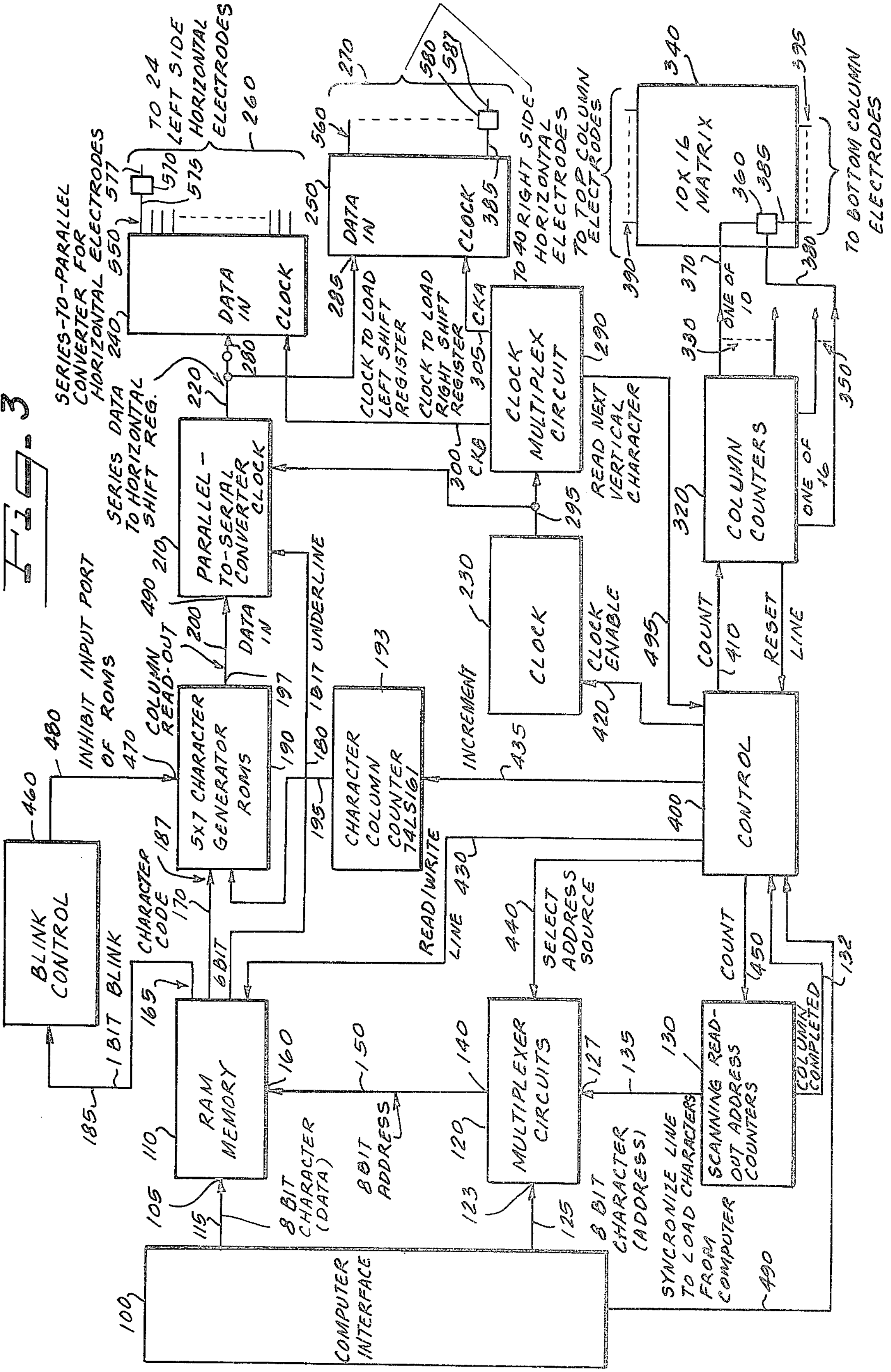
FIG. 3 is an exemplary block diagram of the present invention.

While the principles of the present invention find a particular utility in an interface for a scanning plasma display, it will be understood that the interface arrangement of the present invention may be utilized in other combinations. By way of exemplary disclosure of the best mode of practicing the invention there is shown generally in FIG. 1 a multi-layer scanning plasma display 10 with which the interface of the present invention is combined. The multi-layers plasma display 10 is of a conventional construction and is used as a scanning plasma display. An example of a typical type of scanning plasma display is the IEEE 256 Mini. The display 10 can display a row 15 having 32 characters horizontally. A typical column 17 contains 8 characters vertically. A set of electrodes 20 and a set of terminals or electrodes 30 brought out to the left and right sides of the multi-layer panel 10 provide the contacts to the horizontal electrodes of the panel 10. A set of terminals or electrodes 40 and a set of terminals or electrodes 50 brought to the top and bottom of the panel 10 provide the contacts to the vertical rows of electrodes in the panel. The 32×8 format of characters results in a total of 256 characters which may be displayed.

FIG. 2 discloses a close-up of the dot matrix structure upon which a typical character is constructed. A dot matrix 60 consisting of a set of 5 columns 70 by 8 rows 80 is used for each character. Since there are 8 characters in each column and each character has a total of 8 rows of dots 80 there are a total of 64 horizontal rows of dots in the display 10. As a result, there are 64 horizontal electrodes in the groups 20 and 30. Since there are five columns 70 in each character and there are a total of 32 characters in any row such as the row 15 there are 160 vertical electrodes brought out through the electrode groups 40 and 50. The splitting of the electrodes on the left and right side between the groups 20 and 30 and the splitting between the top and the bottom between the groups 40 and 50 is dictated by the manufacturing consideration associated with the display 10. A scanning plasma display of the variety in question here requires that the interface associated with it present to each column in the groups 40 or 50 a new set of data 60 times a second to maintain a non-flickering display. Since there are 160 vertical columns in the groups 40 and 50, the requirement becomes one of refreshing these 160 columns 60 times a second or, each one 60th of a second the 160 columns must be refreshed. Each column has dedicated to it 106 to 107 microseconds. The interface, as discussed subsequently, takes 6–7 microseconds to load the 64 bits of data for a given one of the 160 columns. Then, the data are held constant for 100 microseconds before the next column is loaded.

FIG. 3 discloses a block diagram of an exemplary interface and the claimed invention. A computer interface 100 is connected to an input port 105 of a RAM memory 110 by a set of parallel character data lines 115. A multiplexer circuit 120 has a first input port 123 connected to the computer interface 100 by a set of parallel address lines 125. A second input port 127 to the multiplexor circuits 120 is connected to a set of scanning readout address counters 130 by a set of parallel address lines 135. The readout address counters 130 includes a four bit counter to address the row, one through 8 being addressed on the display 10. When the eighth row has been addressed, a signal on the line 132 so informs the control unit 400. A five bit counter composed of a four bit 74 LS 161 and a single bit off of a 74 LS 112 counter keeps track of which character column out of 32 is being refreshed. An output port 140 of the multiplexor 120 is connected via an 8 bit parallel address bus 150 to an address input port 160 of the random axis memory 110. The output of the random axis memory 110 at an output port 165 consists of a 6 bit parallel character code on a set of lines 170, a 1 bit underline code on a line 180, and a 1 bit blink code on a line 185. The 6 bit parallel character code on the lines 170 provides an address input at a port 187 to a set of character generator ROMS 190 which are set up in the 5×7 character format used for the display 10. A further address input is supplied by a character column counter 193 on a set of lines 195 also to the input port 187. The output from the character generator ROMS 190 at a port 197 is a parallel column readout on a set of lines 200 which consists of 7 bits. The 7 bits on the lines 200 and the 1 bit underline on the line 180 are converted to an 8 bit serial stream of data in a parallel-to-serial converter 210. The output of the parallel-to-serial converter 210 on a line 220 is a serial stream of column data. Eight bits are associated with a given column of a given character.

Recall that in order to refresh the display 10 a complete column of information must be supplied to the display 60 times a second. Since each character is represented by the group of five 8 bit columns 70 and there are 8 characters in each column such as the column 17, a given column of information fed to the display 10 must contain a total of 64 bits. The parallel-to-serial converter 210 operates in conjunction with a clock source 230 to supply a total of 64 bits on the line 220 to a pair of shift registers 240 and 250. The shift registers 240-250 act as series-to-parallel converters and their buffered outputs are a group of signals 260 and 270 which are applied to the left side horizontal electrodes 20 or to the right side horizontal electrodes 30.

It is an important feature of this invention that the two series-to-parallel converter units 240 and 250 are able to selectively read the serial bit streams on the line 220 and as a result conveniently and economically segregate the bit streams on the line 220 each of which contains a total of 64 bits into those bits associated with the left side horizontal electrodes 20 and the right side horizontal electrodes 30. The selective reading of the bit streams on the line 220 at a pair of input ports 280 and 285 of the series-to-parallel converters 240 and 250 is accomplished by means of a clock multiplexing circuit 290. The clock multiplexing circuit receives clock pulses on a line 295 from the clock source 230. The clock multiplexing circuit generates two sets of outputs on a pair of lines 300 and 305 labeled CKB and CKA in FIG. 3. It is the function of the outputs on the lines 300 and 305 to properly strobe the data on the line 220 into the serial-to-parallel converters 240 and 250. In addition to properly supplying a sequence of 64 data bits on the line 220 which are then converted into a parallel representation in the serial-to-parallel converters 240 and 250, it is necessary to select the proper column into which the column of data in the converters 240 and 250 is to be written. A set of column counters 320 counts through a total of 160 columns. The set of column counters 320 has two sets of outputs. One set of output lines 330 selects one of ten columns in a 10×16 matrix 340. It is the purpose of the 10×16 matrix 340 to efficiently select one of 160 columns. A second set of outputs 350, from the column counters 320, selects one of 16 rows of the 10×16 matrix 340. The 10×16 matrix 340 is formed in a conventional fashion for electronic matrixes and has 160 elements. These 160 elements are the drive circuits for each of the columns of data being selected. A typical drive circuit is indicated by a block 360 within the matrix 340. The block 360 is selected when a line 370 is energized by the column counters 320 selecting the column within which the block 360 resides. The row within which the block 360 resides is selected by energizing a line 380 by the second set of outputs 350 of the column counters 320. Thus by selecting a row and a column in the 10×16 matrix 340 the proper column, one of 160 columns in the display 10 may be energized. A set of outputs 390 from the 10×16 matrix is connected to corresponding members of the top electrodes 40 of the display 10. A second set of outputs 395 of the matrix 340 is connected to the bottom electrodes 50 of the display 10. Thus, the 10×16 matrix 340 provides an efficient and economical means to select either the top column electrodes 40 or the bottom column electrodes 50 of the display 10. A control mechanism of a conventional variety 400 is connected to the column counters 320 by a count line 410, to the clock source 230 by a clock enable line 420, to the ram memory 110 by a read write control line 430, to the multiplex circuits 120 by a select line 440 and to the scanning read-out address counters 130 by a count line 450. The purpose of the control unit 400 is to fully synchronize the operation of the circuitry. A blink control 460 consisting of a one-half or one hertz oscillator and a gate is connected to an inhibit output port 470 of the 5×7 character generator roms 190. When the one bit blink line 185 is enabled and one-half or one hertz oscillator in the blink control 460 goes high, the output of the 5×7 character generator roms 190 is inhibited at the port 470 by a line 480 thereby suppressing display of that particular character during that particular refresh cycle.

The block diagram of FIG. 3 operates as follows: When loading data, an 8 bit character code is supplied to the computer interface 100 by the host computer. Similarly an 8 bit address code is supplied to the computer interface 100. The computer interface 100 makes available on the 8 bit parallel lines 115, the character code to the input port 105 of the RAM memory 110. In parallel, the computer interface 100 also makes available the 8 bit address code on the parallel lines 125 to the first input port 123 of the multiplexer 120. A synchronization line 490 synchronizes the reading of new characters in the RAM memory 110 with the scanning of existing characters in the RAM memory 110. The synchronization line 490 provides a signal to the control unit 400 informing the control unit that data is available at the input port 105 of the RAM memory 110. Recall as noted previously a total of 6 to 7 micro seconds is spent loading a column of 64 bits of data for the horizontal electrodes 20 and 30 of display 10. The control unit 400 senses when a given set of 64 bits has been loaded into the series-to-parallel converts 240 and 250 and at that point allows the RAM memory 110 to be accessed by the computer interface 100. When accessible, the control unit 400 provides a signal on the read-write line 430 which allows the RAM memory 110 to have the 8 bit data on the lines 115 written into the storage location identified by the 8 bit address on the lines 125. During the time the control unit 400 allows the computer interface 100 to access the RAM memory 110, a select address source line 440 enables the multiplex circuits 120 to select an 8 bit input from the parallel lines 125 identifying the current address location into which the 8 bit character on the line 115 is to be written in the ram memory 110. This writing process continues till either the computer interface 100 ceases to receive data from the host computer or until the control unit 400 senses that the 100 microsecond quiescent interval for a given column selected from the groups 40 or 50 of the display 10 has timed out. At that time the control unit 400 disables the selection of 8 bit character addresses on the lines 125 and instead by a signal on line 440, causes the multiplexer circuits 120 to select a value from the scanning read-out counters for the vertical characters 130 on the lines 135. Further, at that time, the read/write signal on the line 430 assumes the polarity required for reading, and the RAM memory 170 reads out a character stored at the location specified by the scanning read-out address counters 130, to the read out port 165, and thus to the lines 170, 180 and 185. The control unit 400 seizes control of the circuitry from the computer interface 100 for the entire 7 microseconds so that a total of 8 characters may be read out. The 6 bit character code on the lines 170 in conjunction with the value in the character column counter 193 addresses the 5×7 character generator roms 190 which in turn read out a column of bits which is specified by the character column counter 193 for the character code specified on the lines 170. The seven bit column of data which is read out on the lines 200 is accepted in parallel along with the 1 bit underline on the line 180 by the parallel-to-serial converter 210 at a data input port 490. The clock 230 supplies eight clock pulses which put a total of eight serial data pulses on the line 220 which provides the data input to the two series-to-parallel converters 240 and 250 at the ports 280, 285. Once a total of 8 bits has been read into the series-to-parallel converters 240 and 250, the control unit 400 receives a signal along a line 495 from the clock multiplex circuit 290 indicating that the next character in that vertical column should be read out. At that point the control unit 400 increments the scanning read-out address counters 130, along the line 450. These counters in turn provide an incremented address along the parallel lines 135 to the multiplexer circuits 120 and via the parallel lines 150 to the address input port 160 of the RAM memory 110. The control unit 400 also causes the read/write line 430 to assume the read signal level thus resulting in the next character code in that column being read-out from the RAM memory 110. The character stored in this character position then controls the 5×7 character generator roms 190 which in turn supply another 7 bits of data to the parallel-to-serial converter 210, which in turn loads the series-to-parallel converters 240 and 250. This cycle continues until a total of eight character codes have been read-out from the RAM memory 110 corresponding to the eight vertical characters that share a given vertical electrode from the group 40 or from the group 50. Once the total of 64 bits have been read to the series-to-parallel converters 240 and 250, the logic circuitry remains quiescent for 100 microseconds while the data is being supplied from the buffered outputs 260 and 270 to the horizontal electrodes 20 and 30 of the display 10. At the end of 100 microseconds the control unit 400 causes the column counters 320 to be incremented by a signal on the count line 410, which in turn selects a new column through the 10×16 matrix 340. Another set of 64 bits is then read-out in a period of 6 to 7 microseconds to this new column selected by the 10×16 matrix 340. This latest set of 64 bits which appear in the series-to-parallel converters 240 and 250 is then also maintained for 100 microseconds. This scanning process in repeated 60 times a second for a nonflickering display.

Each of the series-to-parallel converters 240 and 250 has a set of buffers which interface between a set of outputs 550 on the series-to-parallel converters 240 and a set of outputs 560 on the series-to-parallel converter 250, and the display electrodes 20 and 30. A typical drive unit for the series-to-parallel converter 240 is indicated by a block 570 connected to an output 575 from the series-to-parallel converter 240. Similarly a typical driver unit for the series-to-parallel converter 250 is indicated by a block 580 which is connected to alline 585, one of the output lines from the series-to-parallel converter 250.

It should again be noted that an important feature of this invention is the ease with which a translation has been made from a string of parallel data representing the outputs from the 5×7 character generator roms 190 to the set of lines 260 and the set of lines 270 which innerconnect with the horizontal electrodes 20 and 30 of the display 10. Similarly, an efficient and effective translation of the information in the column counters 320 which specify a selected one of 160 columns in the groups of electrodes 40 and 50 of the vertical columns of the display 10 is accomplished by means of the 10×16 matrix 340. The lines 390 are connected to the top electrods 40 and the lines 395 are connected to the bottom electrodes 50.

FIG. 4 discloses the details of the clock 230 and the clock multiplex circuit 290 shown in FIG. 3. A 20 megahertz crystal oscillator 600 provides an output on a line 610 and is connected to a clock input 615 of a JK flip-flop 620. The J-input of the JK flip-flop 620 is connected to the line 420 which is the clock enable line controlled by the control unit 400. The 20 megahertz oscillator 600 runs continuously and the output of the JK flip-flop 620 on the line 295 is a controllable clock signal. The clock multiplex circuit 290 is composed of a 4 bit counter 650 connected to a pair of NAND gates 660 and 670. The NAND gate 660 is in turn connected to an inverter 680 as well as a NAND gate 690. Another NAND gate 700 is connected to the inverter 680 and to the JK flip-flop 620. The 4 bit counter 650 is incremented by the clock pulses on the line 295. Three outputs of the 4 bit counter 650, on lines 710, 720, and 730 provide inputs to the NAND gates 660 and 670. The fourth output from the counter 650, on a line 740, provides a reset to the counter 650 via a NAND gate 745. The output from the NAND gate 745, on the line 747 resets the counter 650. The line 740 is also connected to the line 495 to cause the control unit 400 to read the next character in the current column from the RAM memory 110.

Figure 5:
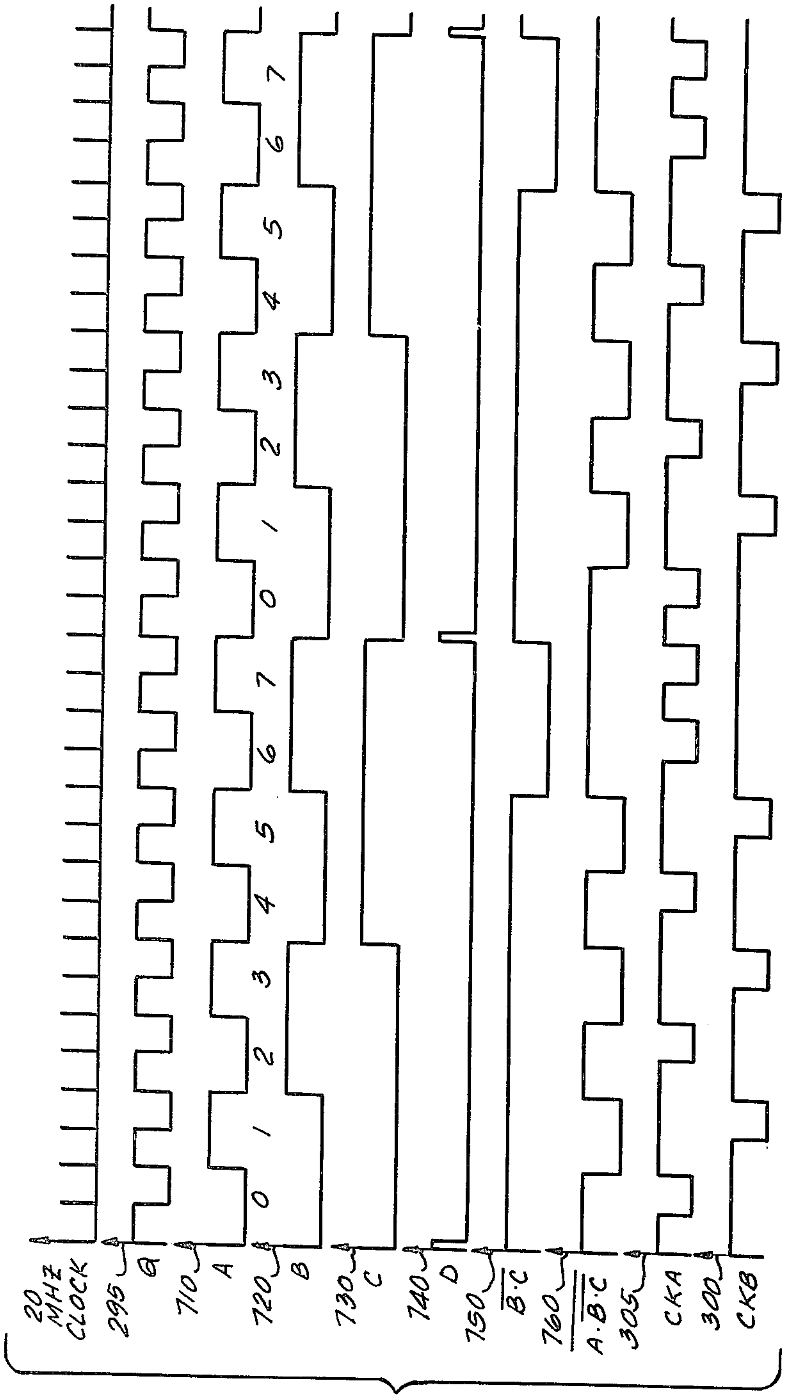
FIG. 5 is a timing diagram illustrating the operation of the circuit of FIG. 4.

FIG. 5, a timing diagram, illustrates the operation of the clock multiplex circuit 290. Before considering the details of the operation of the clock multiplex circuit 290 it should be noted with respect to FIG. 1 and FIG. 3 that there are 24 left side horizontal electrodes 20 and there are 40 right side horizontal electrodes 30. Thus, the CKB signal on the line 300 must supply 3 pulses for every 5 pulses supplied on the CKA signal of the line 305. With respect now to FIGS. 4 and 5, it should be noted that as the 4 bit counter 650 counts, the A bit which is connected to the line 710 is the least significant bit with the D bit connected to the line 740 being the most significant bit. As indicated in FIG. 5, the counter 650 changes state whenever the clock input on the line 295 goes high. It can be seen from FIG. 5 that the bits A, B, C, D count through an 8 bit sequence with the bit D being reset promptly upon its being set so that it gives out only a very narrow pulse. As may be seen from FIG. 5 the output on the line 750 which is the output of NAND gate 670 cooperates with the output on the line 710 which is the least significant bit output to produce a signal on the line 760, the output of NAND gate 660. The signal on the line 760 represents the NAND of the functions B and C NANDED with A. This provides an input on the line 760 to the NAND gate 690 whose output is the signal CKA on the line 305. A second input, on a line 770 to the NAND gate 690 is connected to the negated output 775 of the JK flipflop 620. The signal on the line 770 insures that the signal on the line 305, CKA is a pulse signal. The NAND gate 700 has an input 780 which is the inversion of the signal or the line 760. Thus, the outputs on the lines 305 and 300 are mutually exclusive. A second input to the gate 700, on the line 770, which corresponds to the second input to the gate 690, insures that the signal on line 300, CKB is a pulse signal. An examination of the wave forms in FIG. 5 with respect to the line 305 and the line 300 will indicate that during the time interval when 3 pulses are being generated on the line 300, CKB, and before the next sequence of 3 pulses is generated a total of 5 pulses is generated on the line 305, CKA. Thus, in a set of 8 counts as indicated in FIG. 5 by the numerals 0 through 7, a total of 3 clock pulses are generated on the line 300 and a total of 5 clock pulses are generated on the line 305. When the signal on the line 740 goes high, indicating that the D bit, the most significant bit, has become a 1, the counter 650 is reset. The reset signal on the line 740 which is also connected to the line 495 on FIG. 3 is fed back to the control 400 which in turn causes the scanning read-out address counters 130 to be incremented by 1 by a signal on the line 450. This results in the next character in the vertical column of eight characters being read-out. As can be seen from FIG. 5, when the next sequence of eight pulses appears on the line 295 the ratio of 5 pulses to 3 on the lines 305 and 300 is repeated.

FIG. 6 discloses the details of the typical driver circuit 360 used in the 10×16 matrix 340. A typical driver circuit 360 is shown having an input 370 to the base of a 2N 6218 transistor 800. The base input 370 comes from one of 10 column signals 330 and the emitter input on the line 380 comes from one of the 16 row signals 350. The output line 385 is connected to a corresponding bottom column electrode from the group 50. A resistor 810 connects the output line 385 to a collector 815 of the transistor 800.

FIG. 7 discloses the details of a typical driver 570 or 580 interposed between the outputs 550, 560 of the series-to-parallel converter units 240 or 250 and the left or right side horizontal electrodes 20 or 30 of the display 10. A data signal is supplied to the line 575 or the line 585 and through a 13 kΩ resistor 820 to a base 825 of a 2N6218 transistor 830. A collector 835 of the transistor 830 is connected to a resistor 840 having a value of 220 kΩ. The lines 577 or 587 which connect to a left or a right horizontal electrode, respectively, connect to an end 845 of the resistor 840 as well as to one end 847 of a resistor 850. The resistor 850 has a 220 kΩ value also. Another end 855 of the resistor 850 is connected to a 250 volt power supply of a conventional variety which is not illustrated.

Figure 8:
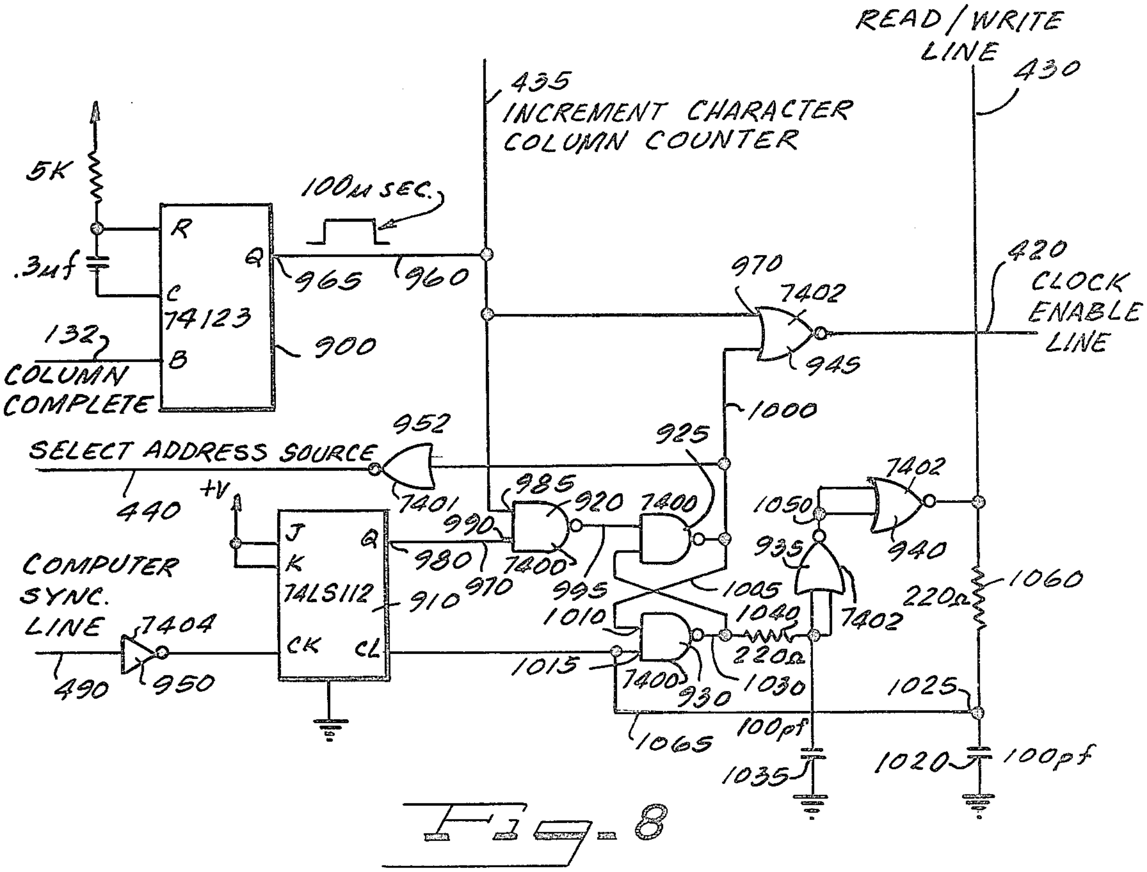
FIG. 8 is a schematic diagram of the control unit 400.

FIG. 8 discloses the details of the control unit 400. The control unit 400 includes a one-shot 900, a J-K flip-flop 910, a NAND gate 920, two NAND gates 925, 930 connected as an R-S flip-flop, two NOR gates 935, 940 used as inverter buffers, a NOR gate 945 used as an OR gate and a pair of inverters 950, 952. Each time a set of eight characters has been read out of the RAM memory 110, thus loading 64 bits into the two serial-to-parallel converters 240, 250 a signal is generated by the column counter portion of the scanning readout address counters 130 on the line 132 which triggers the one-shot 900, a 100 micro-second pulse is generated on a line 960 connected to the Q output 965 of the one-shot 900. The high signal on the line 960 connected to an input 970 of the gate 945 causes the output on the line 420 to go low disabling the clock signals on the line 295. This halts cycling of the interface for 100 micro-seconds and allows data from the computer interface 100 to be loaded into the RAM memory 110.

If data are available, a signal on the line 490 inverted by the gate 950 sets the J-K flip-flop 910. Upon being set, a line 975 connected to a Q output 980 of the flip-flop 910 goes high. The NAND gate 920 has two high inputs 985, 990 which results in a low output on a line 995. The low output on the line 995 sets the R-S flipflop composed of the NAND gates 925, 930 which places a high signal on a line 1000. The high signal on the line 1000 is inverted by the inverter 952 driving the line 440 low thus causing the multiplexer circuits 120 to select the address lines 125 to be presented along the lines 150 to the address input port 160 of the RAM memory 110. Also, along a line 1005, an input 1010 to the NAND gate 930 goes high. A second input 1015 to the gate 930 is also high because a capacitor 1020 has charged a point 1025 high. As a result, a low signal appears on a line 1030 which feeds back to the gate 925 holding the R-S flip-flop composed of the gates 925, 930 set. The low signal on the line 1030 causes a capacitor 1035 to rapidly discharge through a resistor 1040 thus, the gate 935 outputs a high on a line 1050 which is inverted by the gate 940 which puts a low voltage on the line 430. The low voltage on the line 430 is a write signal to the RAM memory 110. As a result the data on the lines 115 are written into the location specified by the address on the lines 150. As noted above, the multiplexer circuits 120 have selected the address on the line 125, from the computer interface 100.

When the signal on the line 430 goes low, a resistor 1060 discharges the capacitor 1020. When the voltage at the point 1025 goes low, the low signal is transmitted along a line 1065 to the R-S latch composed of the gates 925, 930. The flip-flop 910 and the R-S latch both reset. The line 1030 goes high. The resistor 1040 then charges the capacitor 1035 which in turn causes the gate 935 to go low and the gate 940 to go high thus terminating the write signal on the line 430.

It should be noted that since the gate 945 functions as an OR gate, the clock enable line 420 is held low until both the output of the one-shot 900 on line 960 and the output of the R-S flip-flop on the line 1000 go low. This prohibits a new read cycle from being initiated just because the 100 micro-second dwell interval has terminated if a new character is being written into the memory 110. When the signal on the line 960 goes low, the character column counter on the line 435 is incremented so that the ROM memory 190 reads out the next column of the present vertical column of eight characters. Once the fifth column has been read out, the column counter 193 increments the column counter portion of the read-out address counters 130 so that the next one of the 32 character columns may be read out and refreshed.

It will be understood that while the interface herein has been described with respect to a scanning plasma display, all the principles utilized herein are applicable to any dot matrix display which needs to be refreshed or rewritten. The fact that a scanning plasma display has been used for the display device is in no way a limitation with respect to the operation or effectiveness of the interface itself.

The computer interface 100 by way of example can be constructed of 7400 series integrated circuits and in particular 74 LS 75 buffer units may be used. The RAM memory 110 may be composed of type 93 L 422 RAM memory chips. The multiplexer circuits 120 may be composed of type 74 LS 157 multiplexer chips. The scanning read-out address counters 130 may be composed of type 74 LS 161 counter chips in conjunction with a 74 LS 112 counter chip. The 5×7 character generators ROMS 190 may be composed of Intel type 3622 RAM memory chips. The control element 400 may be composed in the standard fashion of 7400 integrated circuits or equivalent high speed 7400 integrated circuits. The parallel-to-serial converter unit 210 may be composed of a type 74165 integrated circuit. The series-to-parallel converter unit 240 may be composed to type 74 LS 164 integrated circuit chips. The series-to-parallel converter unit 250 may be composed of type 8273 series-to-parallel converter chips. The column counter element 320 may be composed of a 74 LS 160 BCD counter chip in conjunction with a 74 LS 161 binary counter chip. The 74 LS 160 BCD counter is connected to a 74 LS 42 BCD to decimal decoder chip which produces the 1 of 10 signals on the lines 330. The 74 LS 161 binary counter is connected to type 74 138 integrated circuit chips which convert three lines of binary to one of eight selected outputs. As noted on the figures, all drive transistors are type 2 N 6218.

It should be noted that the interface of FIG. 3 is mounted on a set of printed circuit boards 1100 and 1110 affixed to the rear of the display 10. The display 10 is preferably mechanically and electrically connected to the board 1100 by having the electrodes or terminals 20, 30, 40 and 50 connected directly to parts on the board by soldering or the like. In this way, the minimum depth of the combined unit is assured. Boards 1110 contains the logic elements and board 1100 contains the transistor drive elements such as the elements 800 and 830.

Although various modifications might be suggested by those skilled in the art, it should be understood that I wish to embody within the scope of the patent warranted hereon all such modifications as reasonably and properly come within the scope of my contribution to the art.

I claim as my invention:

1. Apparatus for refreshing the dot display of a selected column of a dot matrix display having a plurality of dots arranged in rows and columns, and a plurlity of terminals associated with said rows and columns, comprising:

means for repetitively selecting at a predetermined first rate one of said columns;

means for respectively generating at a predetermined refresh rate a serial stream of data having one bit for each dot in the selected column;

means for generating two interleaved series of clock pulses;

means responsive to said two interleaved series of clock pulses and to said serial stream of data bits for forming two parallel groups of data bits, a first group consisting of those bits in said serial bit stream associated with a first set of dots in said selected column and a second group consisting of those bits in said serial bit stream associated with a second set of dots in said selected column;

means responsive to said two parallel groups of data bits for generating a first and a second set of electrical signals, each member of which corresponds to a member of said first or said second sets of dots of said selected column; and means for connecting, for a selected time period, each of said members of said first and second sets of electrical signals to terminals associated with the rows corresponding to said first and second sets of dots.

2. The apparatus according to claim 1, wherein:

said means for forming two parallel groups comprises a clock means which generates a first and a second set of mutually exclusive clock pulses.

3. The apparatus according to claim 2 including means for generating said first and second sets of clock pulses such that the ratio of said first and said second sets of mutually exclusive clock pulses, when measured over a selected time interval, corresponds to a selected ratio.

4. The apparatus according to claim 3 including means for generating said first and second sets of clock pulses such that said ratio corresponds to the ratio of the member of horizontal terminals in the first set to the number of horizontal terminals in the second set.

5. An interface unit for use with a dot raster display having a first and third set of horizontal terminals located on opposite sides of the display, and a second set of vertical terminals comprising:

memory mean having a data port;

character generator means connected to said data port of said memory means;

first and second series-to-parallel converter means;

an output of said character generator means being operatively connected to a data input port associated with said first series-to-parallel converter and a data input port associated with said second series-to-parallel converter;

column selection means;

control means connected to said memory means and said column selection means;

a set of parallel outputs of said first series-to-parallel converter being connected to the first set of terminals on the dot raster display;

a set of parallel outputs of said second series-to-parallel converter being connected to the third set of terminals on the dot raster display;

said column selection means being connected to at least a second set of terminals on the dot raster display;

said control means being operative to respectively cycle said memory means at some predetermined rate so as to cause said memory means to present to said character generator means a sequence of stored character codes corresponding to the sequence of character respresentations to be refreshed on the display.

6. The interface according to claim 5, including oscillator means connected to said control means which comprises a first and a second clock means;

said first clock means being operably connected to a clock input of said first series-to-parallel converter;

said second clock means being operably connected to a clock input of said second series-to-parallel converter;

said first and second clock means being operable to generate a first and second train of clock pulses;

said first and second clock trains being mutually exclusive and having a selected ratio of numbers of pulses within a selected period, with respect to one another.

7. An interface unit for use with a dot matrix display having a left and a right set of horizontal terminals and a set of vertical terminals for selecting a dot to be refreshed comprising:

a random access memory having a data port and a control port;

a character generator with an address port operatively connected to said data port of said random access memory;

a first shift register operatively connected to a parallel data output from said character generator so as to convert the parallel data output from said character generator to a serial bit stream;

a second and a third shift register operatively connected so as to convert the serial output from said first shift register to parallel;

a column counter;

a column select matrix connected to said column counter;

a clock means having a first and a second output port;

said clock means comprising an oscillator connected to a counter and being operable to generate a first and a second train of mutually exclusive pulses at said first and second output ports respectively;

said first and said second pulse trains each having numbers of pulses, measured with respect to a selected interval of time, such that the ratio of said numbers of pulses in said first and said second pulse trains corresponds to a selected ratio;

said first output port being connected to a clock input of said second shift register;

said second output port being connected to a clock input of said third shift register;

a multiplexer circuit connected to an address port of said random access memory and having a first and a second address input port;

a scanning readout address counter connected to said first address port of said multiplexer and operative to provide the address of a character stored in the random access memory which is to be refreshed;

a character column counter operatively connected to said address port of said character generator;

said column select matrix being operably connected to the top and bottom terminals of the dot matrix display;

said second and third shift registers having a first and a second set of parallel outputs respectively with members of said first set of parallel outputs being operably connected to corresponding members of the left set of horizontal terminals of the dot matrix display and members of said second set of parallel of outputs being connected operably to corresponding members of the right set of horizontal terminals of the dot matrix display;

control means comprising a one-shot connected operatively to said character column counter, and connected to a first input of a first and a second gate, a first flip-flop having an output connected to a second input of said second gate, a second flip-flop operatively connected to an output of said second gate, a first output of said second flip-flop being connected to a second input of said first gate and an input of a third gate, an output of said third gate being connected to a select line of said multiplexer, an output of said second gate being connected to a control input to said clock means, a second output of said second flip-flop being connected operatively through a resistor to an input to a fourth gate with a capacitor connected between said input of said fourth gate and a reference potential, an output of said fourth gate being connected to a reset circuit comprising a gate whose output is connected to said control port of said random access memory with said output also being connected to a resistor-capacitor circuit operative to reset said second flip-flop at the end of a write operation;

said control means being operable to repetitively count said column counter so as to cause said column select matrix repetitively specify a selected one of the set of vertical terminals at a known rate.

8. The interface according to claim 7, with said clock means having means for generating said first and second pulse trains such that said selected ratio corresponds to the ratio of the number of terminals in the left set of horizontal terminals with respect to the number of terminals in the right set of horizontal terminals of the dot matrix display.

* * * * *